US011489423B2

(12) United States Patent
Takeda et al.

(10) Patent No.: US 11,489,423 B2
(45) Date of Patent: Nov. 1, 2022

(54) ALIGNING APPARATUS AND METHOD OF MANUFACTURING ALIGNED COIL

(71) Applicant: DENSO CORPORATION, Kariya (JP)

(72) Inventors: Hiroaki Takeda, Kariya (JP); Hiroki Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 389 days.

(21) Appl. No.: 16/842,312

(22) Filed: Apr. 7, 2020

(65) Prior Publication Data

US 2020/0336054 A1    Oct. 22, 2020

(30) Foreign Application Priority Data

Apr. 19, 2019    (JP) .............................. JP2019-080407

(51) Int. Cl.
| | | |
|---|---|---|
| *B23P 19/00* | (2006.01) | |
| *H02K 15/085* | (2006.01) | |
| *H02K 15/04* | (2006.01) | |
| *H02K 1/16* | (2006.01) | |
| *H02K 15/02* | (2006.01) | |
| *H02K 15/06* | (2006.01) | |

(52) U.S. Cl.
CPC .......... *H02K 15/085* (2013.01); *H02K 1/165* (2013.01); *H02K 15/024* (2013.01); *H02K 15/0414* (2013.01); *H02K 15/064* (2013.01); *H02K 15/067* (2013.01); *Y10T 29/5313* (2015.01)

(58) Field of Classification Search
CPC .... H02K 15/0428; H02K 3/12; H02K 15/064; H02K 15/0056; H02K 15/085; Y10T 29/49009; Y10T 29/49012; Y10T 29/49073; Y10T 29/5313; Y10T 29/53143
USPC ......... 29/729, 596, 597, 598, 605, 606, 732, 29/745, 760, 761, 840
See application file for complete search history.

(56) References Cited

U.S. PATENT DOCUMENTS 9,077,233 B2 *   7/2015   Yoshida ............... H02K 15/085
10,742,101 B2 *   8/2020   Ohno ................... H02K 15/064

FOREIGN PATENT DOCUMENTS

| JP | 2004-173357 A | 6/2004 |
| JP | 2004-312946 A | 11/2004 |
| JP | 2013-165540 A | 8/2013 |
| JP | 2015-198563 A | 11/2015 |

* cited by examiner

*Primary Examiner* — Thiem D Phan
(74) *Attorney, Agent, or Firm* — Oliff PLC

(57) ABSTRACT

An aligning apparatus, which is provided for aligning coil segments to form an aligned coil, includes a cylindrical jig and a hook jig. The cylindrical jig has an outer cylinder to surround a radially outer periphery of the aligned coil and an inner cylinder to be surrounded by a radially inner periphery of the aligned coil. The hook jig has hooks arranged in a radial fashion and is rotatable relative to the cylindrical jig in a radial direction. The cylindrical jig further has an inner entrance provided in the inner cylinder, an outer entrance provided in the outer cylinder, and at least one of an inner guide wall extending from a front opening edge of the inner entrance radially inward and backward in the rotational direction and an outer guide wall extending from a front opening edge of the outer entrance radially outward and backward in the rotational direction.

10 Claims, 14 Drawing Sheets

ALIGNING APPARATUS AND METHOD OF MANUFACTURING ALIGNED COIL

CROSS-REFERENCE TO RELATED APPLICATION

This application is based on and claims priority from Japanese Patent Application No. 2019-080407 filed on Apr. 19, 2019, the contents of which are hereby incorporated by reference in their entirety into this application.

BACKGROUND

1 Technical Field

The present disclosure relates to an aligning apparatus for forming an aligned coil and a method of manufacturing the aligned coil using the aligning apparatus.

2 Description of Related Art

There are known rotating electric machines such as motor-generators used in electric vehicles. These rotating electric machines have a stator that includes an aligned coil formed of a plurality of coil segments (or electrical conductor segments). In manufacturing the stator, the coil segments are aligned in an annular shape to form the aligned coil; then the aligned coil is assembled into slots of a stator core. In addition, the aligned coil is also referred to as temporarily-assembled coil.

SUMMARY

According to the present disclosure, there is provided an aligning apparatus for aligning a plurality of coil segments in an annular shape to form an aligned coil. Each of the coil segments is substantially U-shaped to have a pair of first and second leg portions extending parallel to each other and a connecting portion that connects the first and second leg portions. The aligning apparatus includes a cylindrical jig and a hook jig. The cylindrical jig has an outer cylinder configured to surround a radially outer periphery of the aligned coil, an inner cylinder configured to be surrounded by a radially inner periphery of the aligned coil, and a receiving space formed between the outer and inner cylinders to allow the first and second leg portions of all the coil segments to be received therein in a circumferentially-aligned manner. The hook jig is arranged on one axial side of the cylindrical jig and rotatable relative to the cylindrical jig in a rotational direction. The hook jig has a plurality of hooks that are arranged in a radial fashion and spaced at such intervals as to allow the first and second leg portions of the coil segments to be inserted between the hooks. Moreover, the cylindrical jig further has an inner entrance, an outer entrance and at least one of an inner guide wall and an outer guide wall. The inner entrance is provided in the inner cylinder within only part of the entire circumferential range of the inner cylinder. Through the inner entrance, the receiving space formed between the outer and inner cylinders communicates with a space radially inside the inner cylinder. The inner entrance is formed so as to allow, for each of the coil segments, the first leg portion of the coil segment to pass through the inner entrance. The outer entrance is provided in the outer cylinder within only part of the entire circumferential range of the outer cylinder. Through the outer entrance, the receiving space formed between the outer and inner cylinders communicates with a space radially outside the outer cylinder. The outer entrance is formed so as to allow, for each of the coil segments, the second leg portion of the coil segment to pass through the outer entrance while the first leg portion of the coil segment passes through the inner entrance. The inner guide wall extends, from an opening edge of the inner entrance located on a front side in the rotational direction of the hook jig, both radially inward and backward in the rotational direction. The outer guide wall extends, from an opening edge of the outer entrance located on the front side in the rotational direction of the hook jig, both radially outward and backward in the rotational direction.

According to the present disclosure, there is also provided a method of manufacturing an aligned coil as described above using the aligning apparatus. This method includes the steps of: assembling the cylindrical jig, whose dimensions are set according to outer and inner diameters of the aligned coil, to the hook jig; inserting the first and second leg portions of one of the coil segments respectively into a space defined by one circumferentially-adjacent pair of the hooks and the inner guide wall and a space formed radially outside the outer cylinder and between another circumferentially-adjacent pair of the hooks; rotating the cylindrical jig and the hook jig relative to each other by an angle corresponding to the interval between each circumferentially-adjacent pair of the hooks; and removing, after the leg portions of all the coil segments forming the aligned coil have been received in the receiving space of the cylindrical jig, the aligned coil out of the receiving space.

According to the present disclosure, there is also provided another method of manufacturing an aligned coil as described above using the aligning apparatus. This method includes the steps of: assembling the cylindrical jig, whose dimensions are set according to outer and inner diameters of the aligned coil, to the hook jig; inserting the first and second leg portions of one of the coil segments respectively into a space formed radially inside the inner cylinder and between one circumferentially-adjacent pair of the hooks and a space defined by another circumferentially-adjacent pair of the hooks and the outer guide wall; rotating the cylindrical jig and the hook jig relative to each other by an angle corresponding to the interval between each circumferentially-adjacent pair of the hooks; and removing, after the leg portions of all the coil segments forming the aligned coil have been received in the receiving space of the cylindrical jig, the aligned coil out of the receiving space.

DESCRIPTION OF EMBODIMENTS

Figure 1:
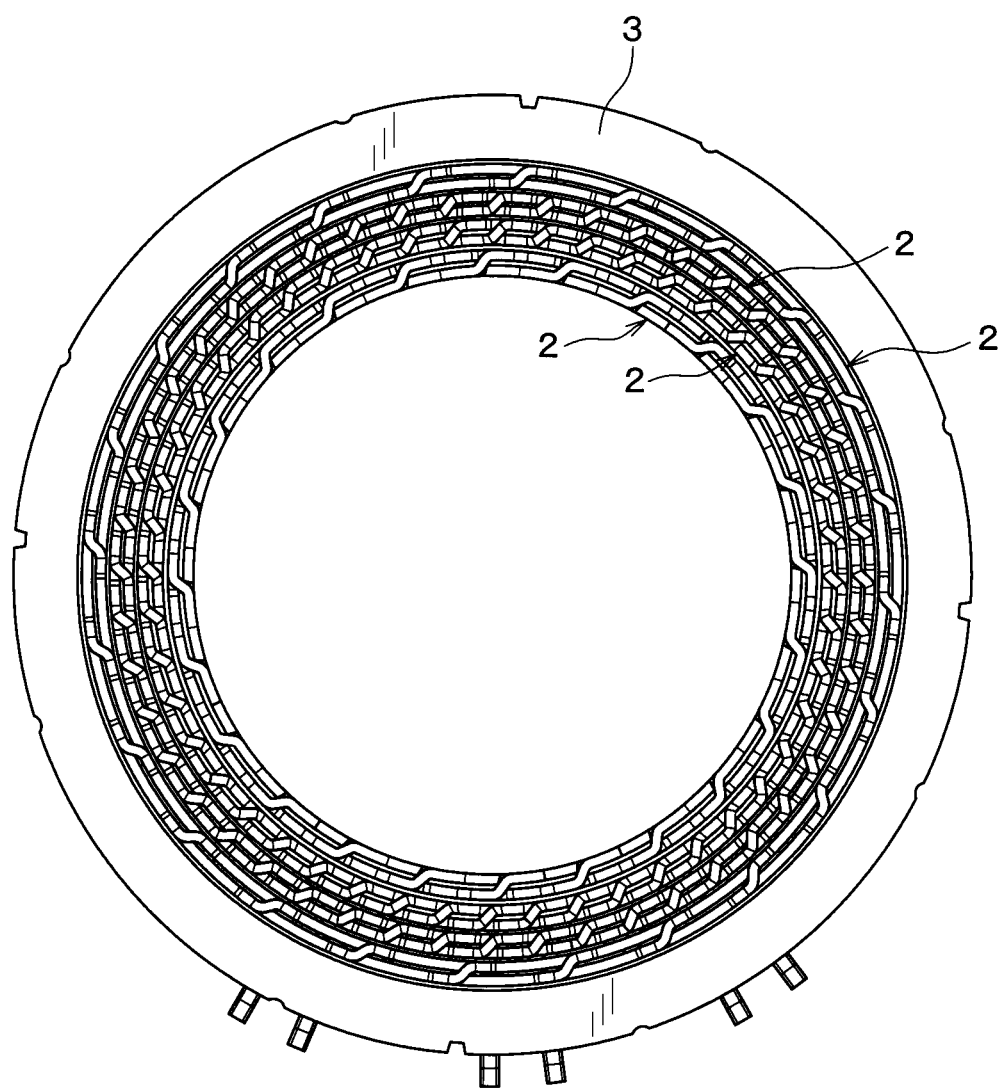
FIG. 1 is a plan view illustrating aligned coils, each of which is formed with an aligning apparatus according to a first embodiment, in a state of being inserted in slots of a stator core.

There is known an aligning apparatus for forming an aligned coil having a predetermined diameter (see, for example, Japanese Patent Application Publication No. JP 2013-165540 A). After being formed with the aligning apparatus, the aligned coil is removed from the aligning apparatus, combined with other aligned coils having different diameters from the aligned coil, and assembled into slots of a stator core.

The diameters of the aligned coils, which are together assembled into the slots of the stator core, gradually increase from a radially inner side to a radially outer side in the slots. However, the known aligning apparatus is configured to form only aligned coils having the predetermined diameter. Therefore, to form the aligned coils of a given stator which have different diameters, it is necessary to employ a plurality of aligning apparatuses configured to respectively form the aligned coils. Moreover, the diameters of the aligned coils of the given stator are different from the diameters of the aligned coils of another stator having different dimensions from the given stator. Therefore, to manufacture a plurality of stators having different dimensions, it is necessary to employ a plurality of dedicated machines each including a plurality of aligning apparatuses configured to respectively form a plurality of aligned coils having different diameters. Consequently, the manufacturing cost of the stators will be increased.

In contrast, with the configuration of the above-described aligning apparatus according to the present disclosure, it is possible to form aligned coils of various diameters by maintaining the hook jig as a common hook jig and replacing the cylindrical jig with different cylindrical jigs each of which has its dimensions set according to the outer and inner diameters of a corresponding one of the aligned coils. Consequently, it becomes possible to form all the aligned coils of a given armature (or stator) using a single machine that includes the aligning apparatus. Moreover, it also becomes possible to form, using the same machine, all the aligned coils of another armature having different dimensions from the given armature. As a result, it becomes unnecessary to employ a plurality of dedicated machines for manufacturing aligned coils for use in armatures having different dimensions. Hence, with the above configuration of the aligning apparatus, it becomes possible to reduce the cost of manufacturing aligned coils of various diameters.

In the case of the cylindrical jig having the inner guide wall, the aligning apparatus according to the present disclosure operates as follows. First, the first and second leg portions of a first one of the coil segments are inserted respectively into a space defined by one circumferentially-adjacent pair of the hooks and the inner guide wall and a space formed radially outside the outer cylinder and between another circumferentially-adjacent pair of the hooks. Then, the cylindrical jig and the hook jig are rotated relative to each other by one pitch (i.e., an angle corresponding to the interval between each circumferentially-adjacent pair of the hooks). Consequently, the first leg portion of the first coil segment is guided, by both the inner guide wall and the hook located immediately backward of the first leg portion in the rotational direction, into the receiving space via the inner entrance and thus received in the receiving space. Meanwhile, the second leg portion of the first coil segment is guided, by the hook located immediately forward of the second leg portion in the rotational direction, into the receiving space via the outer entrance and thus received in the receiving space. Next, the first and second leg portions of a second one of the coil segments are inserted in the same manner as those of the first coil segment. Then, the cylindrical jig and the hook jig are rotated relative to each other by one pitch. Consequently, the first and second leg portions of the second coil segment are guided into and thus received in the receiving space in the same manner as those of the first coil segment. Moreover, at this time, the second coil segment is circumferentially aligned with the first coil segment such that the second coil segment partially overlaps the first coil segment in the axial direction. Next, in the same manner as the first and second coil segments, each of the subsequent coil segments has its first and second leg portions inserted respectively into the aforementioned two spaces and then guided into the receiving space respectively via the inner and outer entrances with relative rotation between the cylindrical jig and the hook jig by one pitch. Consequently, it becomes possible to align all the coil segments in an annular shape to form the aligned coil.

Otherwise, in the case of the cylindrical jig having the outer guide wall, the aligning apparatus operates as follows.

First, the first and second leg portions of a first one of the coil segments are inserted respectively into a space formed radially inside the inner cylinder and between one circumferentially-adjacent pair of the hooks and a space defined by another circumferentially-adjacent pair of the hooks and the outer guide wall. Then, the cylindrical jig and the hook jig are rotated relative to each other by one pitch. Consequently, the second leg portion of the first coil segment is guided, by both the outer guide wall and the hook located immediately backward of the second leg portion in the rotational direction, into the receiving space via the outer entrance and thus received in the receiving space. Meanwhile, the first leg portion of the first coil segment is guided, by the hook located immediately forward of the first leg portion in the rotational direction, into the receiving space via the inner entrance and thus received in the receiving space. Next, in the same manner as the first coil segment, each of the second and subsequent coil segments has its first and second leg portions inserted respectively into the aforementioned two spaces and then guided into the receiving space respectively via the inner and outer entrances with relative rotation between the cylindrical jig and the hook jig by one pitch. Consequently, it becomes possible to align all the coil segments in an annular shape to form the aligned coil.

Moreover, with the above-described methods according to the present disclosure, it is possible to manufacture aligned coils of various diameters using the aligning apparatus at low cost.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

An aligning apparatus 1 according to the first embodiment is configured to align a plurality of coil segments 4 (or electrical conductor segments) in an annular shape to form an aligned coil 2. The aligned coil 2 is then assembled into slots of an armature of a rotating electric machine. More particularly, in the present embodiment, the armature is configured as a stator of the rotating electric machine.

FIG. 1 illustrates four aligned coils 2, each of which is formed with the aligning apparatus 1 according to the first embodiment, in a state of being inserted in the slots of an annular stator core 3 of the stator (i.e., armature). The four aligned coils 2 have different diameters and are located at different radial positions in the slots of the stator core 3. More specifically, the diameters of the aligned coils 2 gradually increase from a radially inner side to a radially outer side in the slots of the stator core 3.

Figure 2:
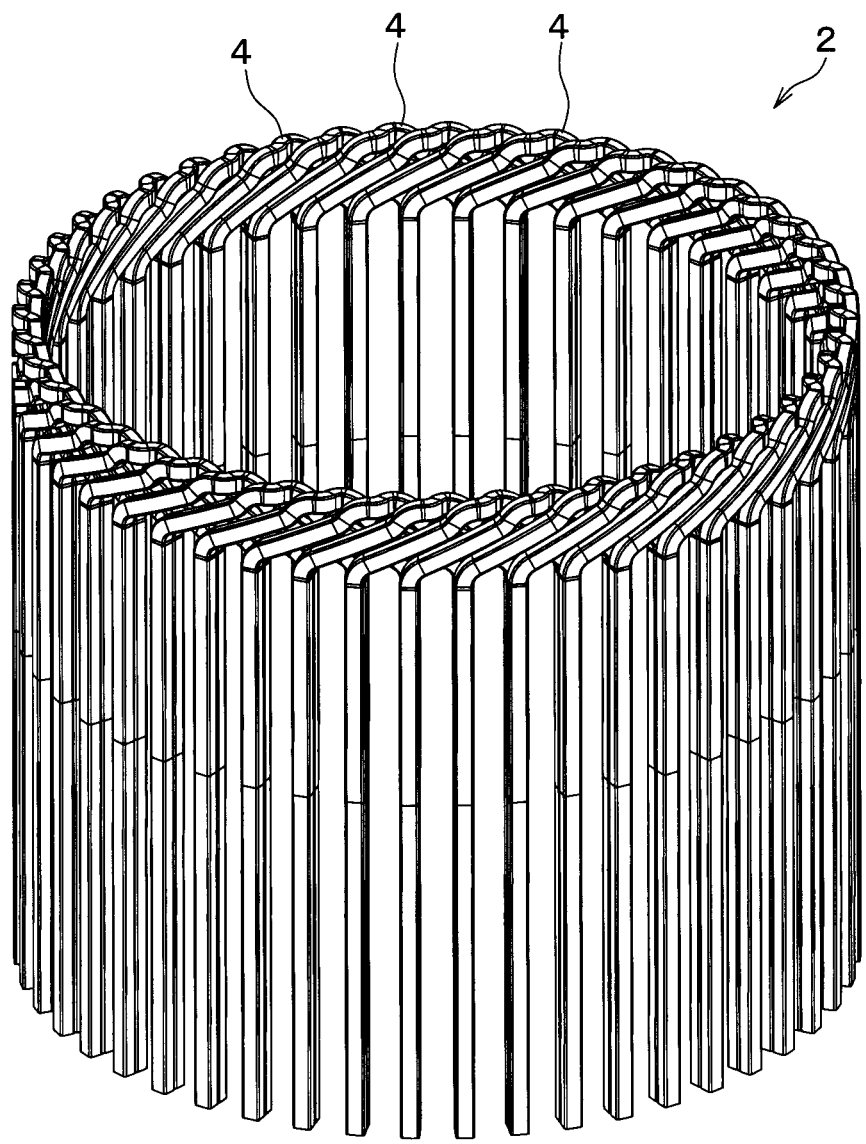
FIG. 2 is a perspective view of one of the aligned coils before being inserted into the slots of the stator core.

FIG. 2 shows one of the aligned coils 2 before being inserted into the slots of the stator core 3. In the present embodiment, each of the aligned coils 2 is formed of 48 coil segments 4. However, it should be noted that each of the aligned coils 2 may alternatively be formed of a different number of coil segments 4 than 48.

Figure 3:
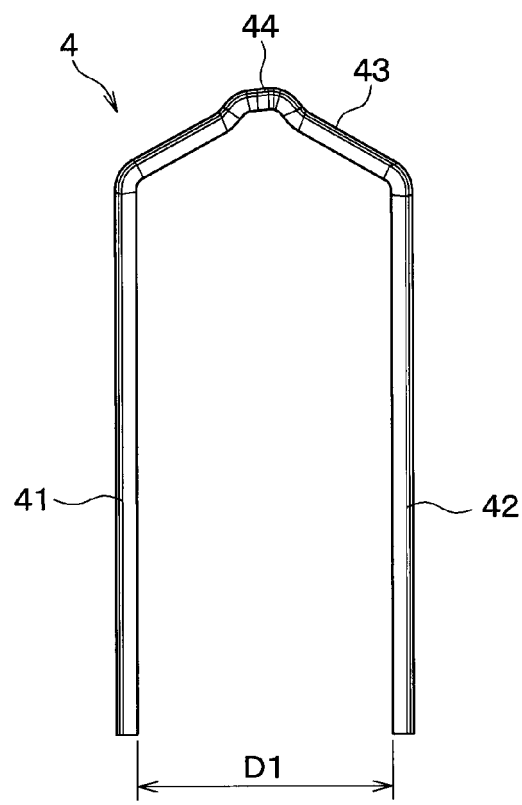
FIG. 3 is a side view of one of coil segments forming one of the aligned coils which is located radially innermost in the slots of the stator core.

FIG. 3 shows one of the coil segments 4 forming that one of the aligned coils 2 which is located radially innermost in the slots of the stator core 3. In contrast, FIG. 4 shows one of the coil segments 4 forming that one of the aligned coils 2 which is located radially outermost in the slots of the stator core 3.

Figure 4:
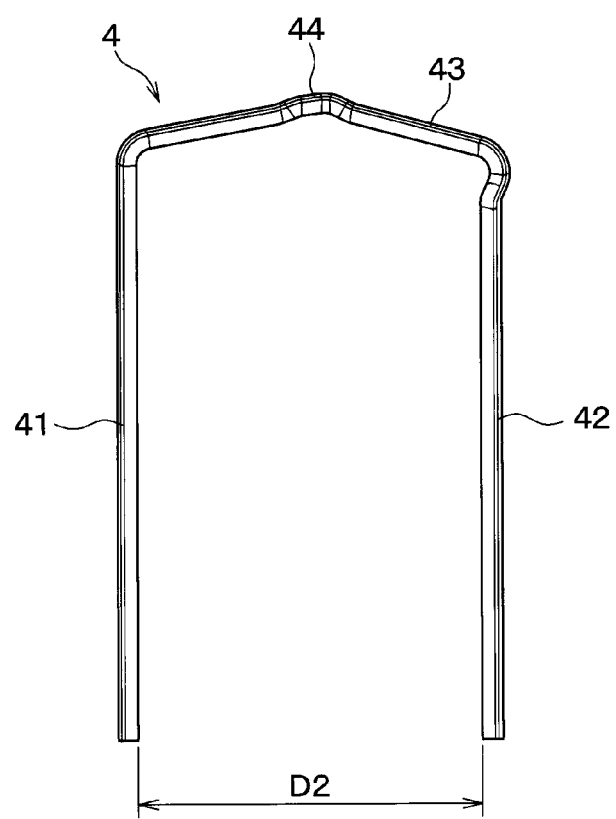
FIG. 4 is a side view of one of coil segments forming one of the aligned coils which is located radially outermost in the slots of the stator core.

As shown in FIGS. 3 and 4, each of the coil segments 4 is substantially U-shaped to have a pair of first and second leg portions 41 and 42 extending parallel to each other and a connecting portion 43 that connects the first and second leg portions 41 and 42.

The interval (or spacing distance) D1 between the first and second leg portions 41 and 42 of the coil segment 4 shown in FIG. 3 is smaller than the interval D2 between the first and second leg portions 41 and 42 of the coil segment 4 shown in FIG. 4. That is, the interval D1 between the first and second leg portions 41 and 42 in each of the coil segments 4 forming the aligned coil 2 located radially innermost in the slots of the stator core 3 is smaller than the interval D2 between the first and second leg portions 41 and 42 in each of the coil segments 4 forming the aligned coil 2 located radially outermost in the slots of the stator core 3.

Figure 5:
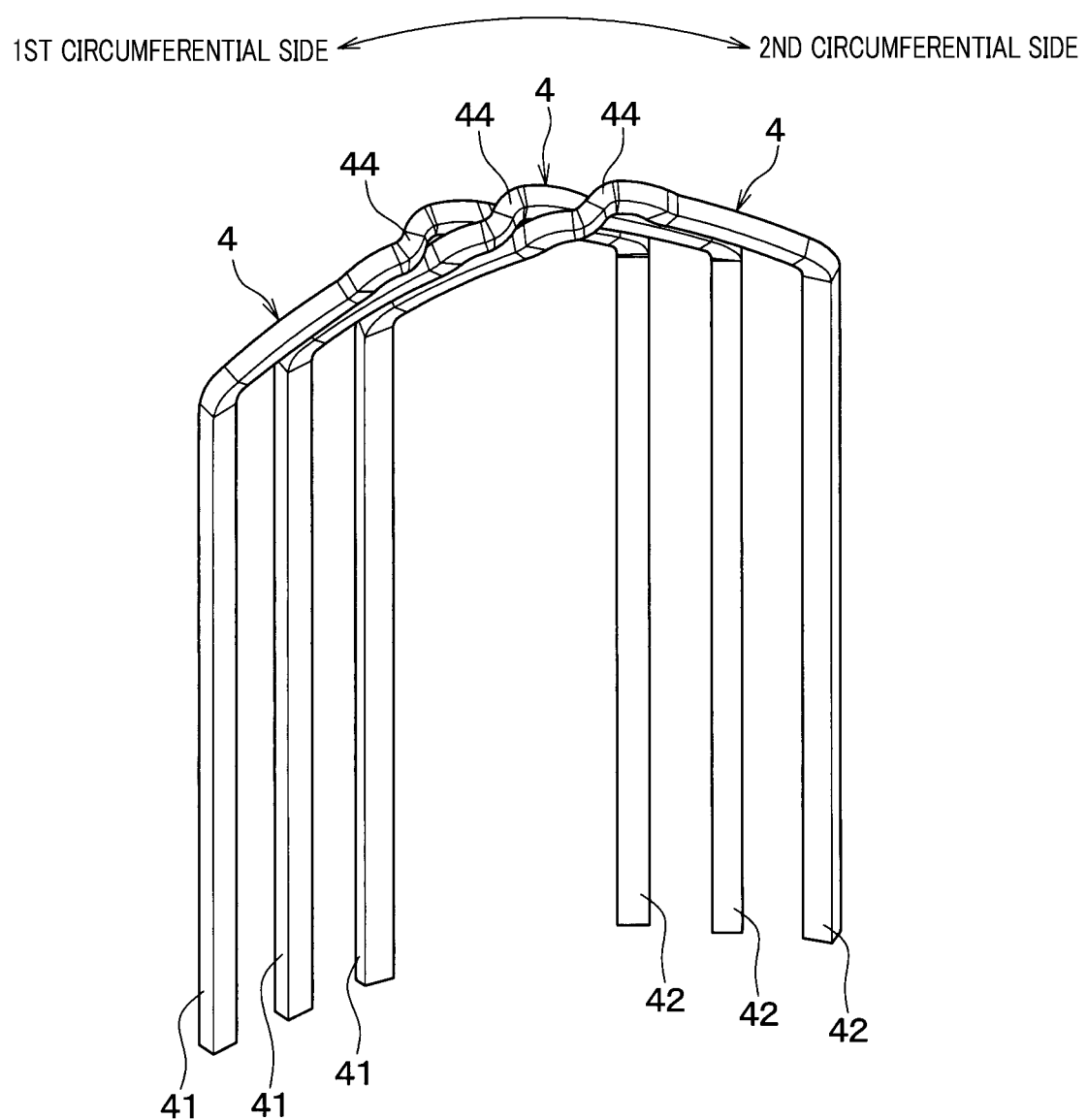
FIG. 5 is a perspective view of three adjacent coil segments among those coil segments which together constitute one of the aligned coils formed with the aligning apparatus according to the first embodiment.

FIG. 5 shows three adjacent coil segments 4 among those coil segments 4 which together form one of the aligned coils 2.

As shown in FIG. 5, in each of the coil segments 4, there is formed a crank-shaped part 44 at the center of the connecting portion 43 (see also FIGS. 3 and 4). Specifically, the crank-shaped part 44 is bent in both a radial direction and an axial direction of the stator core 3. Consequently, for each adjacent pair of the coil segments 4, under a first-circumferential-side part of one of the adjacent pair of the coil segments 4 which is located on a first circumferential side of the other coil segment 4, there is located a first-circumferential-side part of the other coil segment 4; above a second-circumferential-side part of the one of the adjacent pair of the coil segments 4 which is located on the first circumferential side of the other coil segment 4, there is located a second-circumferential-side part of the other coil segment 4. In addition, in each of the coil segments 4, the first-circumferential-side part is located on the first circumferential side of the crank-shaped part 44; the second-circumferential-side part is located on the second circumferential side of the crank-shaped part 44.

Next, the configuration of the aligning apparatus 1 according to the present embodiment will be described with reference to FIGS. 6-9.

The aligning apparatus 1 is installed in a part of a machine (not shown) for manufacturing the aligned coils 2. As shown in FIGS. 6-9, the aligning apparatus 1 includes a cylindrical jig 10, a hook jig 20, an insertion device 30 and a rotating mechanism (not shown).

Figure 6:
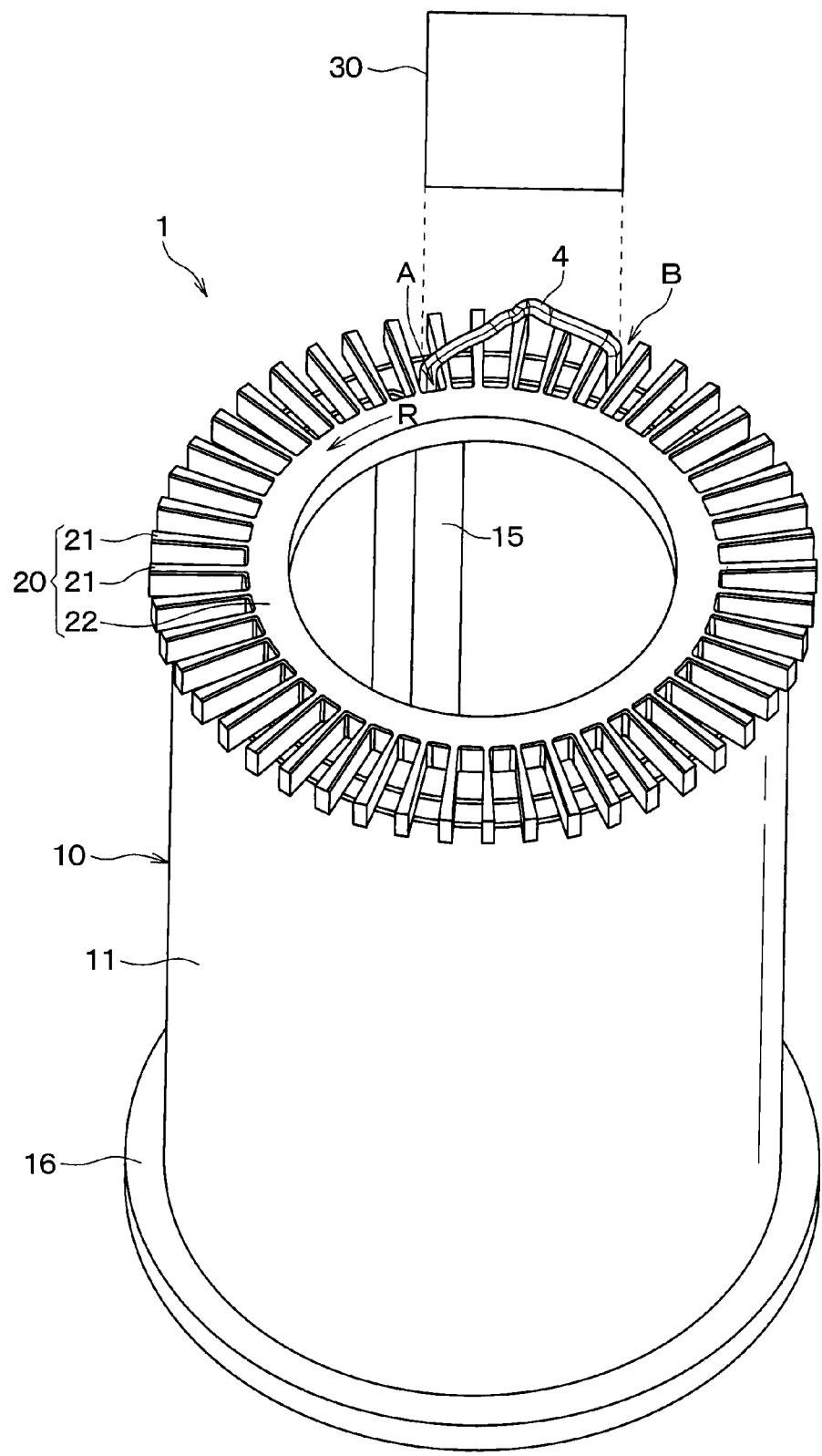
FIG. 6 is a perspective view of the aligning apparatus according to the first embodiment.
Figure 7:
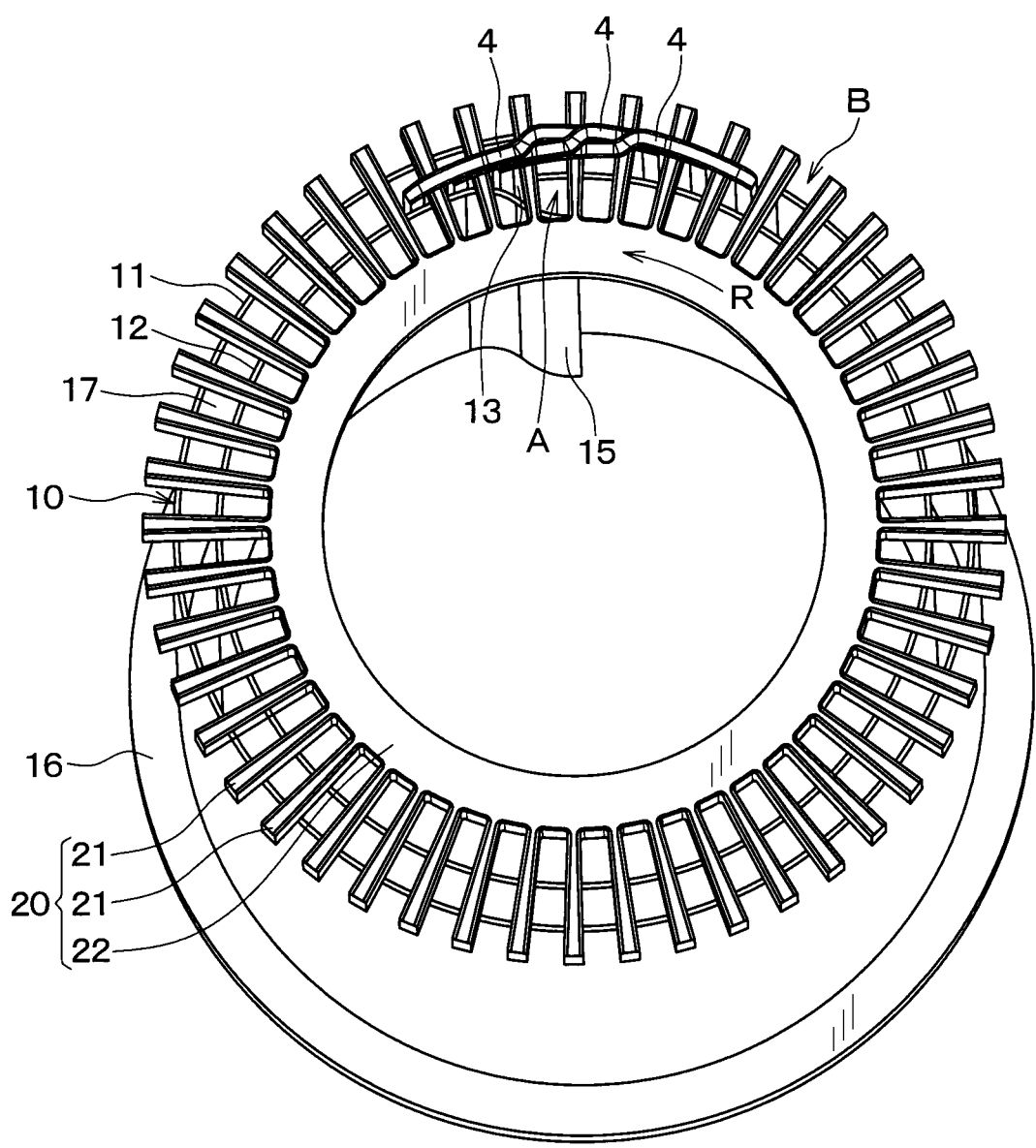
FIG. 7 is another perspective view of the aligning apparatus according to the first embodiment.
Figure 8:
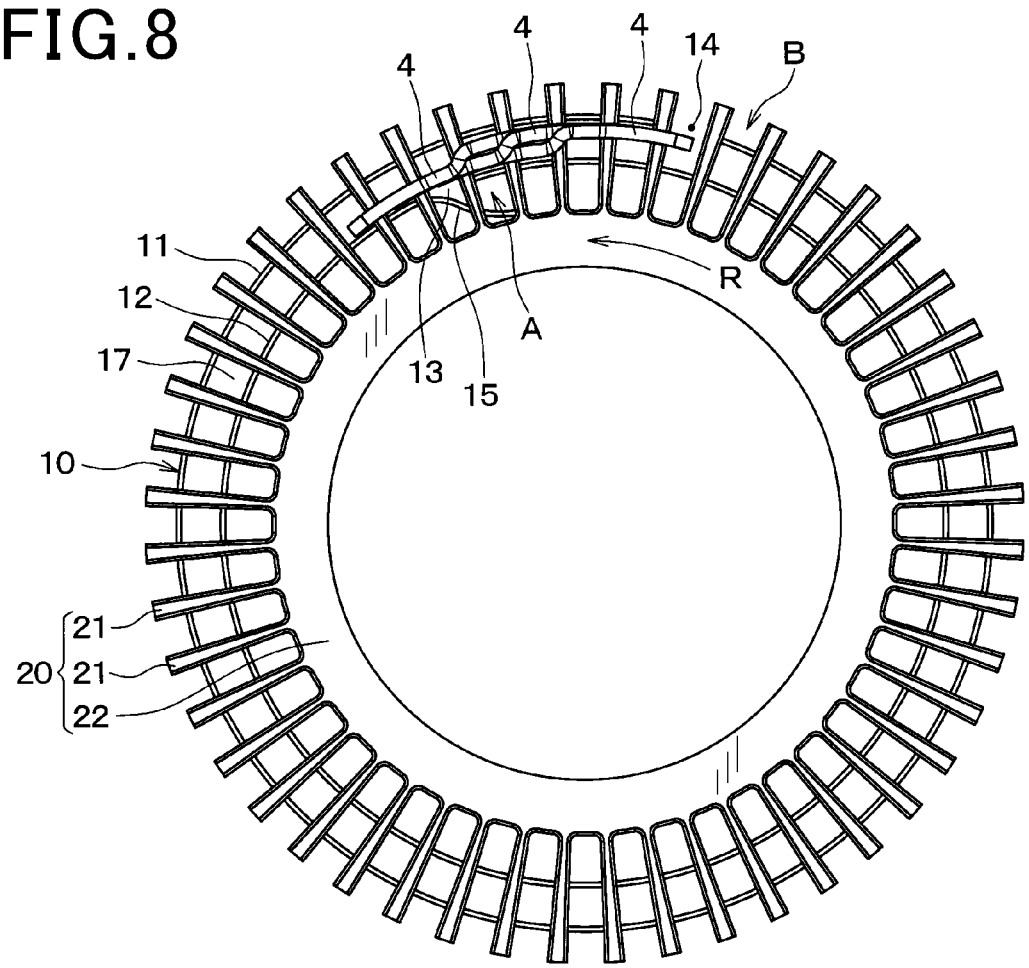
FIG. 8 is a plan view of the aligning apparatus according to the first embodiment.
Figure 9:
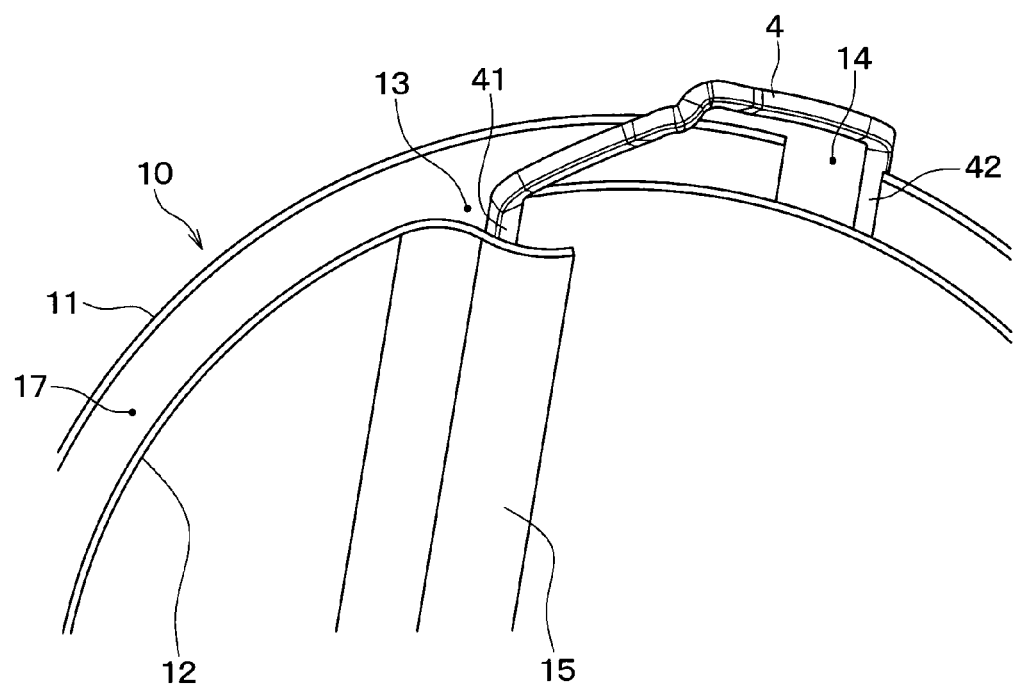
FIG. 9 is a perspective view illustrating part of a cylindrical jig of the aligning apparatus according to the first embodiment.

The cylindrical jig 10 and the hook jig 20 are configured so that they can rotate relative to each other. In FIGS. 6-8, the direction in which the hook jig 20 is rotatable relative to the cylindrical jig 10 is indicated with an arrow R. In addition, in FIG. 9, there are shown only the cylindrical jig 10 and one of the coil segments 4.

It should be noted that for the sake of simplicity, hereinafter, the direction R in which the hook jig 20 is rotatable relative to the cylindrical jig 10 will be referred to as rotational direction R. Moreover, it also should be noted that for the sake of convenience of explanation, hereinafter, the pair of first and second leg portions 41 and 42 in each of the coil segments 4 will be described such that the first leg portion 41 is located forward of the second leg portion 42 in the rotational direction R.

In the aligning apparatus 1, at least the cylindrical jig 10 is provided in a manner of being attachable to and detachable from the machine for manufacturing the aligned coils 10.

The cylindrical jig 10 includes an outer cylinder 11, an inner cylinder 12, an inner entrance 13, an outer entrance 14, an inner guide wall 15 and a base 16.

The outer cylinder 11 is a cylindrical member which is configured to surround the radially outer periphery of an aligned coil 2. In contrast, the inner cylinder 12 is a cylindrical member which is configured to be surrounded by the radially inner periphery of the aligned coil 2. Between the outer and inner cylinders 11 and 12, there is formed a receiving space 17 in which the leg portions 41 and 42 of all the coil segments 4 forming the aligned coil 2 can be received in a circumferentially-aligned manner. Both the outer and inner cylinders 11 and 12 are fixed to the base 16.

The inner entrance 13 is provided in the inner cylinder 12 within only part of the entire circumferential range of the inner cylinder 12. Through the inner entrance 13, the receiving space 17, which is formed between the outer and inner cylinders 11 and 12, communicates with the space radially inside the inner cylinder 12. Moreover, the inner entrance 13 is formed so as to allow, for each of the coil segments 4, the first leg portion 41 of the coil segment 4 to pass through the inner entrance 13.

On the other hand, the outer entrance 14 is provided in the outer cylinder 11 within only part of the entire circumferential range of the outer cylinder 11. Through the outer entrance 14, the receiving space 17, which is formed between the outer and inner cylinders 11 and 12, communicates with the space radially outside the outer cylinder 11. Moreover, the outer entrance 14 is formed so as to allow, for each of the coil segments 4, the second leg portion 42 of the coil segment 4 to pass through the outer entrance 14 while the first leg portion 41 of the coil segment 4 passes through the inner entrance 13. That is, the distance between the inner entrance 13 and the outer entrance 14 is set so as to allow the first and second leg portions 41 and 42 of each of the coil segments 4 to respectively pass through the entrances 13 and 14 at the same time.

The inner guide wall 15 extends, from an opening edge of the inner entrance 13 located on the front side in the rotational direction R, both radially inward and backward in the rotational direction R. The inner guide wall 15 is configured to guide, during relative rotation between the cylindrical jig 10 and the hook jig 20, the first leg portion 41 of each of the coil segments 4 from the space radially inside the inner cylinder 12 to the receiving space 17 formed between the outer and inner cylinders 11 and 12. In addition, the inner guide wall 15 is formed integrally with the inner cylinder 12.

The hook jig 20 is arranged on one axial side (i.e., the upper side in FIGS. 6-8) of the cylindrical jig 10. The hook jig 20 has a plurality of hooks 21, which are arranged in a radial fashion and spaced at such intervals as to allow the first and second leg portions 41 and 42 of the coil segments 4 to be inserted between the hooks 21, and a ring part (or annular part) 22 that connects all the hooks 21. The hook jig 20 is capable of rotating, upon being driven by the not-shown rotating mechanism, relative to the cylindrical jig 10 in the circumferential direction (i.e., the rotational direction R).

In addition, in the present embodiment, the hook jig 20 has 48 hooks 21. However, it should be noted that the hook jig 20 may alternatively have a different number of hooks 21 than 48.

As shown in FIG. 6, the insertion device 30 is provided on the opposite side of the hook jig 20 to the cylindrical jig 10. The insertion device 30 is configured to insert the coil segments 4 one by one at predetermined timings into predetermined spaces. More specifically, the insertion device 30 is configured to insert, for each of the coil segments 4, the first leg portion 41 of the coil segment 4 into a space A defined by one circumferentially-adjacent pair of the hooks 21 and the inner guide wall 15 and the second leg portion 42 of the coil segment 4 into a space B formed radially outside the outer cylinder 11 and between another circumferentially-adjacent pair of the hooks 21. Moreover, the insertion device 30 is capable of inserting, each time the cylindrical jig 10 and the hook jig 20 have rotated relative to each other by an angle corresponding to the interval between each circumferentially-adjacent pair of the hooks 21, one of the coil segments 4. Hereinafter, the angle corresponding to the interval between each circumferentially-adjacent pair of the hooks 21 will be referred to as "one pitch".

Next, the operation of the aligning apparatus 1 according to the present embodiment will be described with reference to FIGS. 10-20.

It should be noted that in FIGS. 10-20 and the following explanation, the three coil segments 4 which are inserted first, second and third among all the 48 coil segments 4 forming one adjoined coil 2 are respectively denoted by $4a$, $4b$ and $4c$; the coil segment 4 which is inserted last among all the 48 coil segments 4 is denoted by $4x$. Moreover, it also should be noted that for illustrating the stepwise rotation of the hook jig 20 relative to the cylindrical jig 10, in FIGS. 10-20, one of the hooks 21 of the hook jig 20 is marked with a "o" sign depicted on a radially outer end portion thereof.

Figure 10:
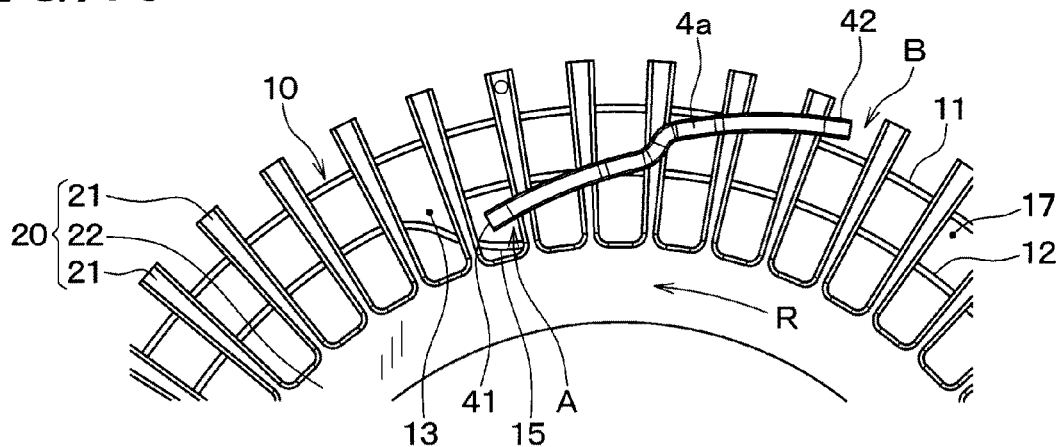
FIG. 10 is a first explanatory diagram illustrating the operation of the aligning apparatus according to the first embodiment.
Figure 11:
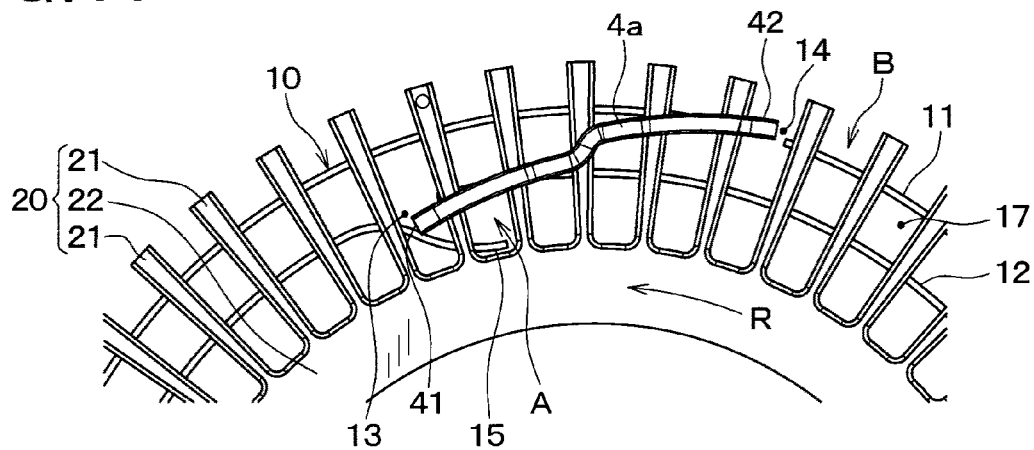
FIG. 11 is a second explanatory diagram illustrating the operation of the aligning apparatus according to the first embodiment.
Figure 12:
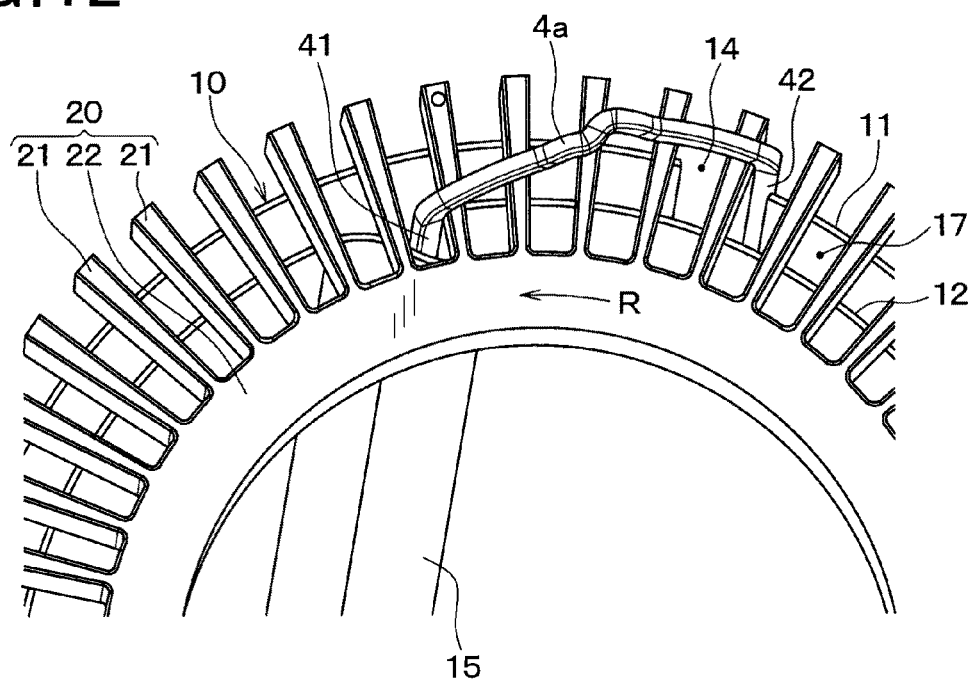
FIG. 12 is a third explanatory diagram illustrating the operation of the aligning apparatus according to the first embodiment.
Figure 13:
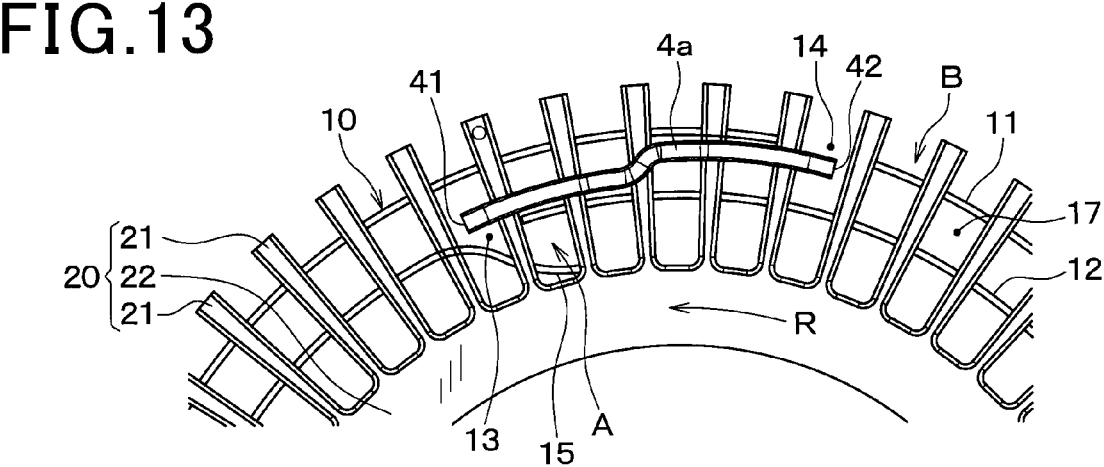
FIG. 13 is a fourth explanatory diagram illustrating the operation of the aligning apparatus according to the first embodiment.
Figure 14:
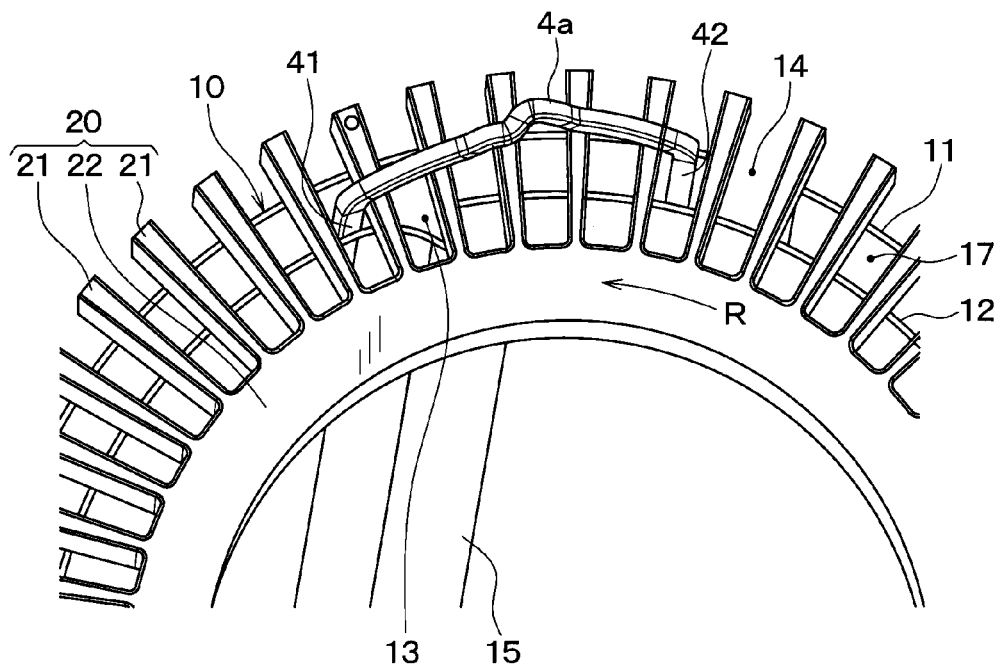
FIG. 14 is a fifth explanatory diagram illustrating the operation of the aligning apparatus according to the first embodiment.

First, as shown in FIG. 10, the first leg portion 41 of the first coil segment $4a$ is inserted into the space A defined by one circumferentially-adjacent pair of the hooks 21 and the inner guide wall 15 while the second leg portion 42 of the first coil segment $4a$ is inserted into the space B formed radially outside the outer cylinder 11 and between another circumferentially-adjacent pair of the hooks 21.

Then, as shown in FIGS. 11-14, the hook jig 20 is rotated relative to the cylindrical jig 10 by one pitch in the rotational direction R. Consequently, the first leg portion 41 of the first coil segment $4a$ is guided, by both the inner guide wall 15 and the hook 21 located immediately backward of the first leg portion 41 in the rotational direction R, into the receiving space 17 via the inner entrance 13 and thus received in the receiving space 17. Meanwhile, the second leg portion 42 of the first coil segment $4a$ is guided, by the hook 21 located immediately forward of the second leg portion 42 in the rotational direction R, into the receiving space 17 via the outer entrance 14 and thus received in the receiving space 17.

In addition, the reason for the second leg portion 42 of the first coil segment $4a$ to be guided into the receiving space 17 via the outer entrance 14 is as follows. In the present embodiment, both the hook 21 located immediately backward of the first leg portion 41 of the first coil segment $4a$ in the rotational direction R and the hook 21 located immediately forward of the second leg portion 42 of the first coil segment $4a$ in the rotational direction R are tapered so that the interval (or circumferential distance) between the two hooks 21 gradually decreases from the radially outer side to the radially inner side of the hook jig 20. On the other hand, the interval (or spacing distance) between the first and second leg portions 41 and 42 of the first coil segment $4a$ is constant. Therefore, with the first leg portion 41 being guided by both the inner guide wall 15 and the hook 21 located immediately backward of the first leg portion 41 to move radially outward, the second leg portion 42 is guided by the hook 21 located immediately forward of the second leg portion 42 to move radially inward. Consequently, upon the first leg portion 41 entering the receiving space 17 via the inner entrance 13, the second leg portion 42 also enters the receiving space 17 via the outer entrance 14.

Figure 15:
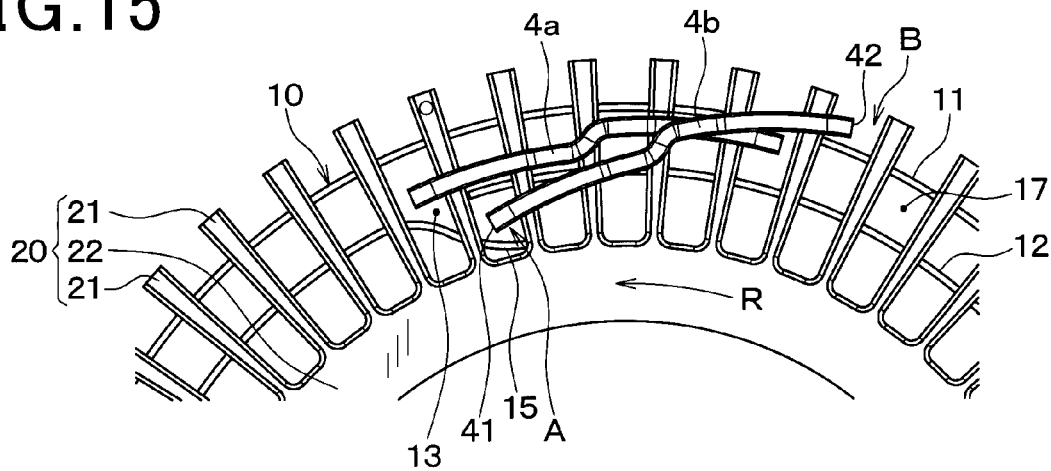
FIG. 15 is a sixth explanatory diagram illustrating the operation of the aligning apparatus according to the first embodiment.

Next, as shown in FIG. 15, the second coil segment 4b is placed in the same manner as the first coil segment 4a. That is, the first leg portion 41 of the second coil segment 4b is inserted into the space A defined by one circumferentially-adjacent pair of the hooks 21 and the inner guide wall 15 while the second leg portion 42 of the second coil segment 4b is inserted into the space B formed radially outside the outer cylinder 11 and between another circumferentially-adjacent pair of the hooks 21.

Figure 16:
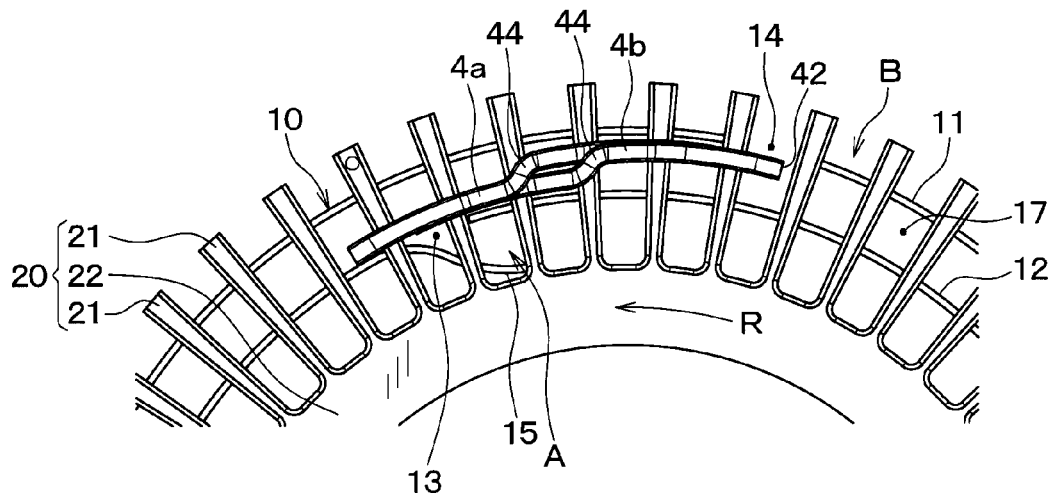
FIG. 16 is a seventh explanatory diagram illustrating the operation of the aligning apparatus according to the first embodiment.

Then, the hook jig 20 is rotated relative to the cylindrical jig 10 by one pitch in the rotational direction R. Consequently, as shown in FIG. 16, the first leg portion 41 of the second coil segment 4b is guided, by both the inner guide wall 15 and the hook 21 located immediately backward of the first leg portion 41 in the rotational direction R, into the receiving space 17 via the inner entrance 13 and thus received in the receiving space 17. Meanwhile, the second leg portion 42 of the second coil segment 4b is guided, by the hook 21 located immediately forward of the second leg portion 42 in the rotational direction R, into the receiving space 17 via the outer entrance 14 and thus received in the receiving space 17. Moreover, at this time, the second coil segment 4b is circumferentially aligned with the first coil segment 4a such that the second coil segment 4b partially overlaps the first coil segment 4a in the axial direction. More specifically, a front part of the second coil segment 4b is located under a front part of the first coil segment 4a while a rear part of the second coil segment 4b is located above a rear part of the first coil segment 4a. In addition, in each of the first and second coil segments 4a and 4b, the front part is located forward of the crank-shaped part 44 in the rotational direction R; the rear part is located backward of the crank-shaped part 44 in the rotational direction R.

Figure 17:
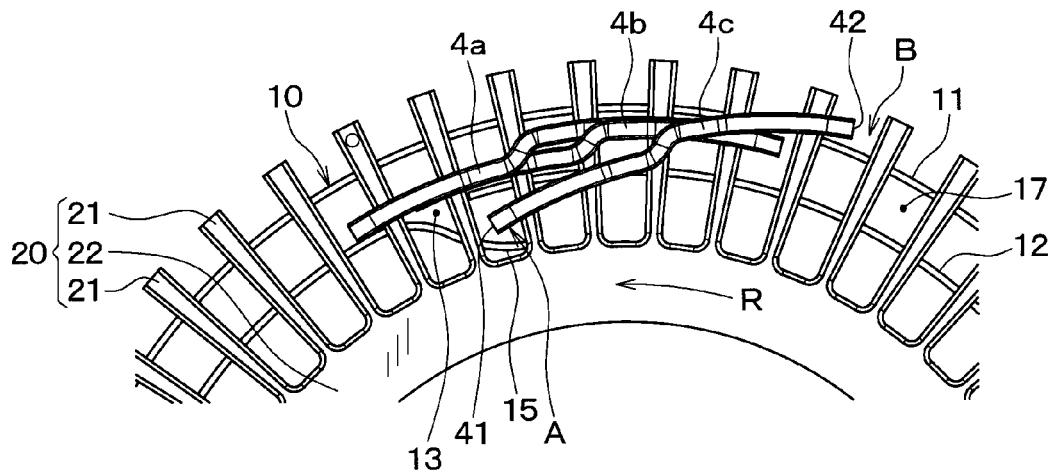
FIG. 17 is an eighth explanatory diagram illustrating the operation of the aligning apparatus according to the first embodiment.
Figure 18:
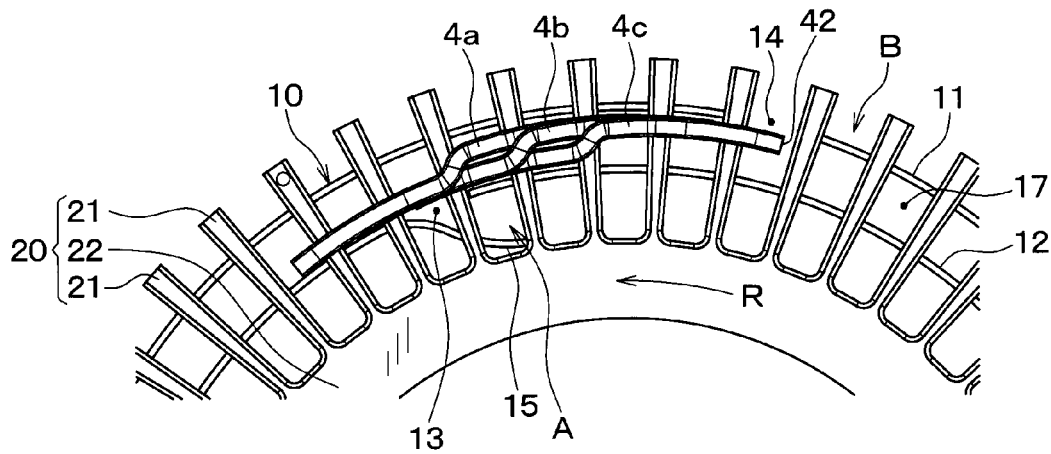
FIG. 18 is a ninth explanatory diagram illustrating the operation of the aligning apparatus according to the first embodiment.
Figure 19:
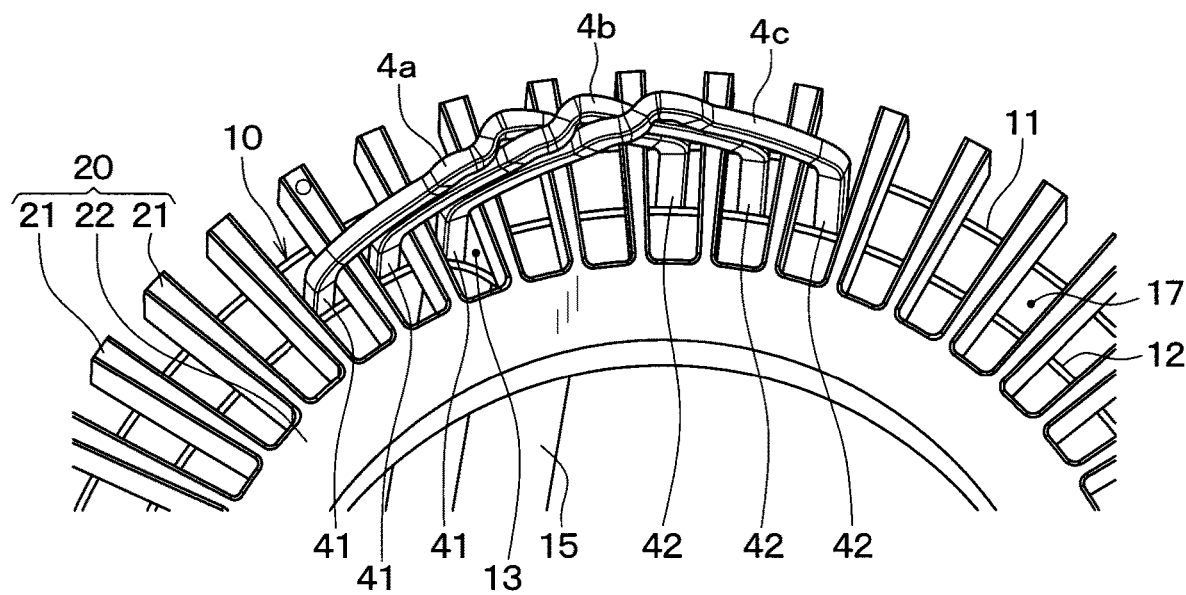
FIG. 19 is a tenth explanatory diagram illustrating the operation of the aligning apparatus according to the first embodiment.

Further, as shown in FIG. 17, the third coil segment 4c is placed in the same manner as the first and second coil segments 4a and 4b. Then, the hook jig 20 is rotated relative to the cylindrical jig 10 by one pitch in the rotational direction R. Consequently, as shown in FIGS. 18 and 19, the first leg portion 41 of the third coil segment 4c is guided, by both the inner guide wall 15 and the hook 21 located immediately backward of the first leg portion 41 in the rotational direction R, into the receiving space 17 via the inner entrance 13 and thus received in the receiving space 17. Meanwhile, the second leg portion 42 of the third coil segment 4c is guided, by the hook 21 located immediately forward of the second leg portion 42 in the rotational direction R, into the receiving space 17 via the outer entrance 14 and thus received in the receiving space 17. Moreover, at this time, the third coil segment 4c is circumferentially aligned with the second coil segment 4b such that the third coil segment 4c partially overlaps the second coil segment 4b in the axial direction.

Furthermore, in the same manner as the first to the third coil segments 4a-4c, each of the subsequent coil segments 4 (i.e., the fourth to the 48th coil segments 4) has its first and second leg portions 41 and 42 inserted respectively into the spaces A and B and then guided into the receiving space 17 respectively via the inner and outer entrances 13 and 14 with rotation of the hook jig 20 relative to the cylindrical jig 10 by one pitch.

Figure 20:
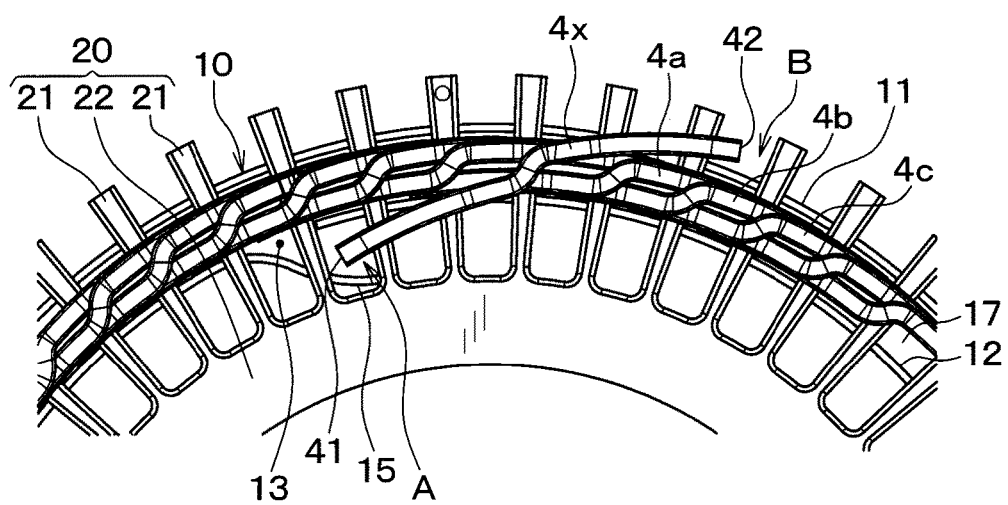
FIG. 20 is an eleventh explanatory diagram illustrating the operation of the aligning apparatus according to the first embodiment.

FIG. 20 illustrates the last (i.e., the 48th in the present embodiment) coil segment 4x in a state of having its first and second leg portions 41 and 42 inserted respectively in the spaces A and B. With the last coil segment 4x being in the state shown in FIG. 20, the hook jig 20 is rotated relative to the cylindrical jig 10 by one pitch in the rotational direction R, thereby causing the first and second leg portions 41 and 42 of the last coil segment 4x to be guided into the receiving space 17 respectively via the inner and outer entrances 13 and 14.

As a result, all the 48 coil segments 4 are circumferentially aligned in an annular shape to form one aligned coil 2.

Figure 21:
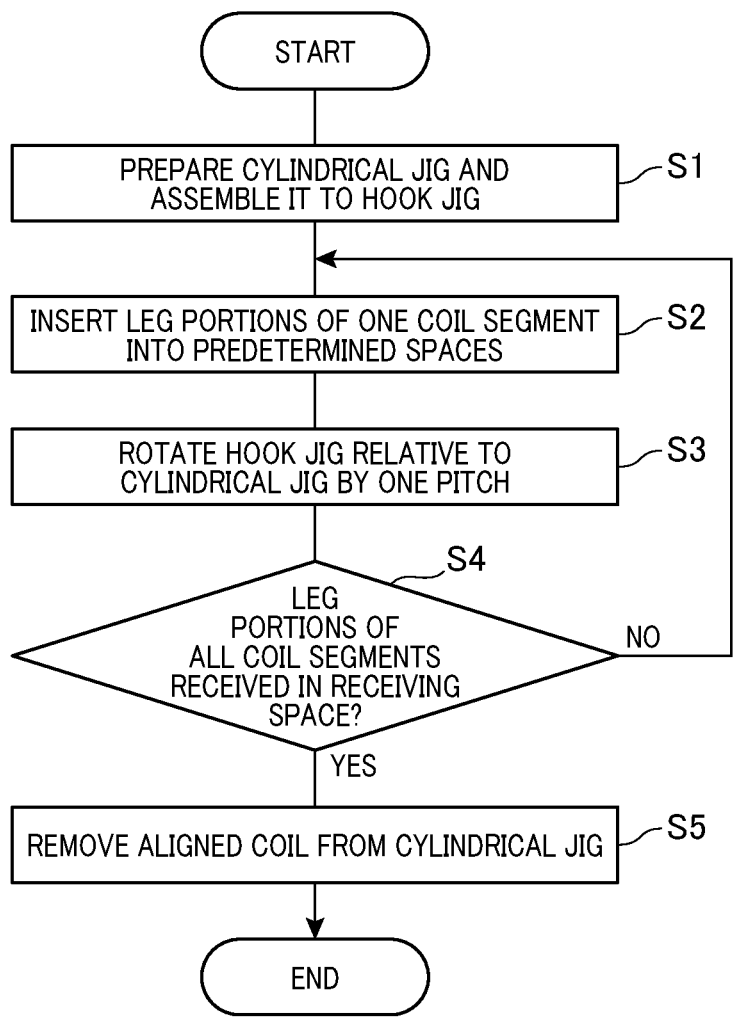
FIG. 21 is a flow chart illustrating a method of manufacturing an aligned coil according to the first embodiment.

Next, a method of manufacturing an aligned coil 2 using the aligning apparatus 1 according to the present embodiment will be described with reference to FIG. 21.

First, in step S1, the cylindrical jig 10, whose dimensions are set according to the outer and inner diameters of the aligned coil 2, is prepared and assembled to the hook jig 20. The assembly of the cylindrical jig 10 and the hook jig 20 is then mounted to the not-shown machine for manufacturing the aligned coil 2. In addition, the machine has the above-described insertion device 30 and rotating mechanism mounted thereto.

In step S2, as shown in FIGS. 10, 15, 17 and 20, the first and second leg portions 41 and 42 of one of the coil segments 4 are inserted by the insertion device 30 respectively into the predetermined spaces. More specifically, in the present embodiment, the first leg portion 41 is inserted into the space A defined by one circumferentially-adjacent pair of the hooks 21 and the inner guide wall 15 while the second leg portion 42 is inserted into the space B formed radially outside the outer cylinder 11 and between another circumferentially-adjacent pair of the hooks 21.

In step S3, as shown in FIGS. 11-14, 16, 18 and 19, the hook jig 20 is rotated relative to the cylindrical jig 10 by one pitch in the rotational direction R.

In step S4, a determination is made as to whether all the coil segments 4 forming the aligned coil 2 have their leg portions 41 and 42 received in the receiving space 17 of the cylindrical jig 10.

If the determination in step S4 results in a "NO" answer, the above steps S2 and S3 are repeated for the next coil segment 4.

In contrast, if the determination in step S4 results in a "YES" answer, i.e., if all the coil segments 4 are aligned in an annular shape to form the aligned coil 2, then in step S5, the aligned coil 2 is held by a chuck jig (not shown) and removed out of the receiving space 17 of the cylindrical jig 10.

As a result, the aligned coil 2 as shown in FIG. 2 is obtained.

In addition, the aligned coil 2 is then combined with other aligned coils 2 having different diameters from the aligned coil 2, and assembled into the slots of the stator core 3.

As described above, the aligning apparatus 1 according to the present embodiment includes the cylindrical jig 10 and the hook jig 20. The cylindrical jig 10 has the outer cylinder 11 configured to surround the radially outer periphery of the aligned coil 2, the inner cylinder 12 configured to be surrounded by the radially inner periphery of the aligned coil 2, and the receiving space 17 formed between the outer and inner cylinders 11 and 12 to allow the first and second leg portions 41 and 42 of all the coil segments 4 to be received therein in the circumferentially-aligned manner. The hook jig 20 is arranged on one axial side of the cylindrical jig 10 and rotatable relative to the cylindrical jig 10 in the rotational direction R. The hook jig 20 has the hooks 21 that are arranged in the radial fashion and spaced at such intervals as to allow the first and second leg portions 41 and 42 of the coil segments 4 to be inserted between the hooks 21. Moreover, in the present embodiment, the cylindrical jig 10 further has the inner entrance 13, the outer entrance 14 and the inner guide wall 15. The inner entrance 13 is provided in the inner cylinder 12 within only part of the entire circumferential range of the inner cylinder 12. Through the inner entrance 13, the receiving space 17 formed between the outer and inner cylinders 11 and 12 communicates with the space radially inside the inner cylinder 12. The inner entrance 13 is formed so as to allow, for each of the coil segments 4, the first leg portion 41 of the coil segment 4 to pass through the inner entrance 13. The outer entrance 14 is provided in the outer cylinder 11 within only part of the entire circumferential range of the outer cylinder 11. Through the outer entrance 14, the receiving space 17 formed between the outer and inner cylinders 11 and 12 communicates with the space radially outside the outer cylinder 11. The outer entrance 14 is formed so as to allow, for each of the coil segments 4, the second leg portion 42 of the coil segment 4 to pass through the outer entrance 14 while the first leg portion 41 of the coil segment 4 passes through the inner entrance 13. The inner guide wall 15 extends, from the opening edge of the inner entrance 13 located on the front side in the rotational direction R of the hook jig 20, both radially inward and backward in the rotational direction R.

With the above configuration of the aligning apparatus 1, it is possible to form aligned coils 2 of various diameters by maintaining the hook jig 20 as a common hook jig and replacing the cylindrical jig 10 with different cylindrical jigs 10 each of which has its dimensions set according to the outer and inner diameters of a corresponding one of the aligned coils 2. Consequently, it becomes possible to form all the aligned coils 2 of a given armature (i.e., stator in the present embodiment) using the single machine that includes the aligning apparatus 1. Moreover, it also becomes possible to form, using the same machine, all the aligned coils 2 of another armature having different dimensions from the given armature. As a result, it becomes unnecessary to employ a plurality of dedicated machines for manufacturing aligned coils 2 for use in armatures having different dimensions. Hence, with the above configuration of the aligning apparatus 1, it becomes possible to reduce the cost of manufacturing aligned coils 2 of various diameters.

Moreover, with the manufacturing method according to the present embodiment, it is possible to manufacture aligned coils 2 of various diameters using the aligning apparatus 1 at low cost.

Second Embodiment

An aligning apparatus 1 according to the second embodiment has a similar configuration to the aligning apparatus 1 according to the first embodiment. Therefore, only the differences therebetween will be described hereinafter.

In the aligning apparatus 1 according to the first embodiment, the cylindrical jig 10 has the inner guide wall 15 that extends, from the opening edge of the inner entrance 13 located on the front side in the rotational direction R, both radially inward and backward in the rotational direction R (see FIGS. 6-9).

Figure 22:
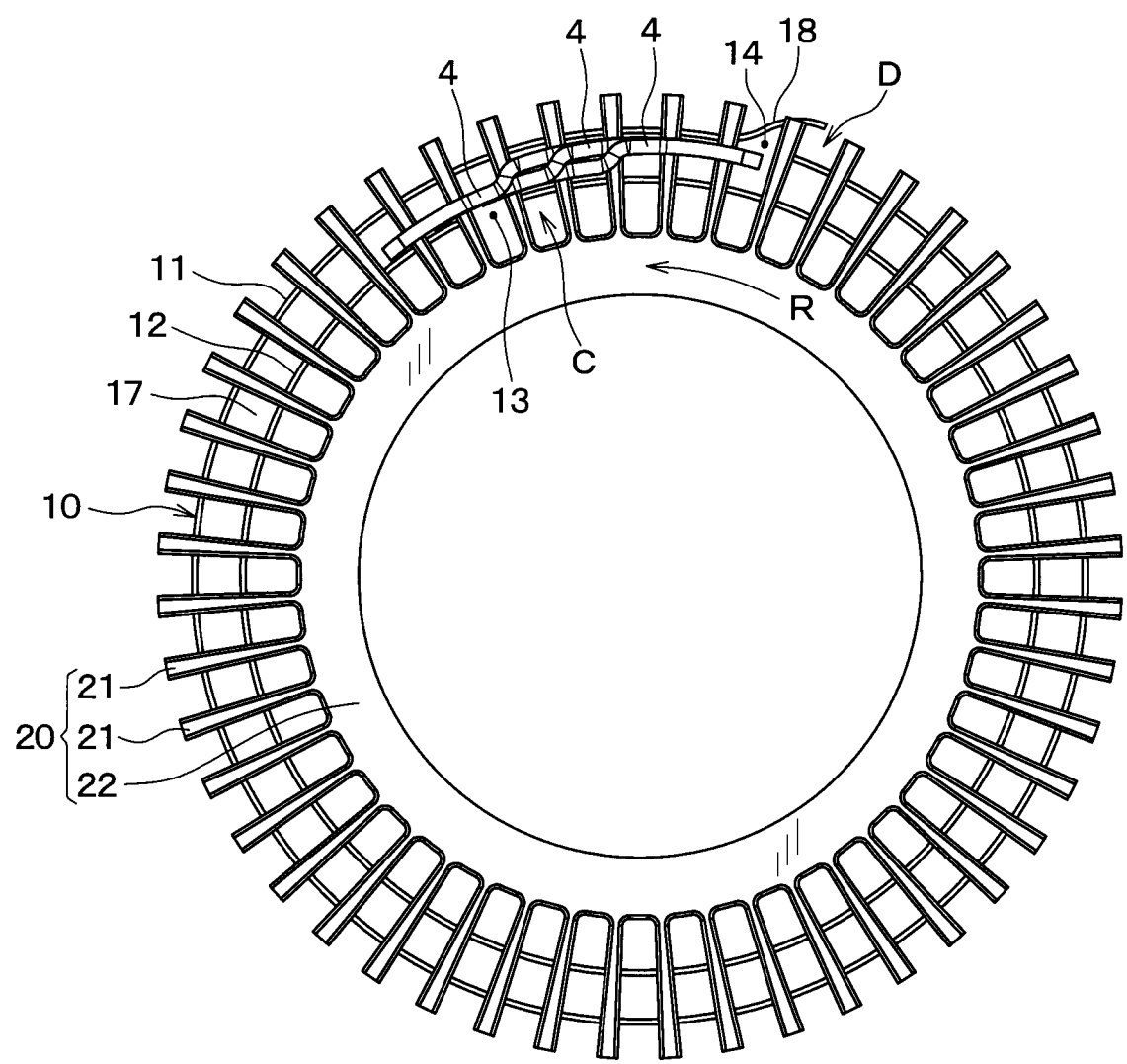
FIG. 22 is a plan view of an aligning apparatus according to a second embodiment.

In contrast, in the aligning apparatus 1 according to the present embodiment, as shown in FIG. 22, the cylindrical jig 10 has no inner guide wall 15, but has an outer guide wall 18 instead. The outer guide wall 18 extends, from an opening edge of the outer entrance 14 located on the front side in the rotational direction R, both radially outward and backward in the rotational direction R. The outer guide wall 18 is configured to guide, during relative rotation between the cylindrical jig 10 and the hook jig 20, the second leg portion 42 of each of the coil segments 4 from the space radially outside the outer cylinder 11 to the receiving space 17 formed between the outer and inner cylinders 11 and 12. In addition, the outer guide wall 18 is formed integrally with the outer cylinder 11.

Next, a method of manufacturing an aligned coil 2 using the aligning apparatus 1 according to the present embodiment will be described with reference to FIGS. 21 and 22.

First, in step S1, the cylindrical jig 10, whose dimensions are set according to the outer and inner diameters of the aligned coil 2, is prepared and assembled to the hook jig 20.

In step S2, the first and second leg portions 41 and 42 of one of the coil segments 4 are inserted by the insertion device 30 respectively into predetermined spaces. More specifically, in the present embodiment, the first leg portion 41 is inserted into a space C formed radially inside the inner cylinder 12 and between one circumferentially-adjacent pair of the hooks 21 while the second leg portion 42 is inserted into a space D defined by another circumferentially-adjacent pair of the hooks 21 and the outer guide wall 18.

The subsequent steps S3-S5 are substantially the same as those described in the first embodiment. Therefore, description of steps S3-S5 is not repeated hereinafter.

According to the second embodiment, it is also possible to achieve the same advantageous effects as achievable according to the first embodiment.

Third Embodiment

An aligning apparatus 1 according to the third embodiment has a similar configuration to the aligning apparatus 1 according to the first embodiment. Therefore, only the differences therebetween will be described hereinafter.

In the aligning apparatus 1 according to the first embodiment, the cylindrical jig 10 has two cylinders, i.e., the outer cylinder 11 and the inner cylinder 12. Moreover, between the outer and inner cylinders 11 and 12, there is formed the receiving space 17 to have the first and second leg portions 41 and 42 of the coil segments 4 received therein (see FIGS. 6-9).

Figure 23:
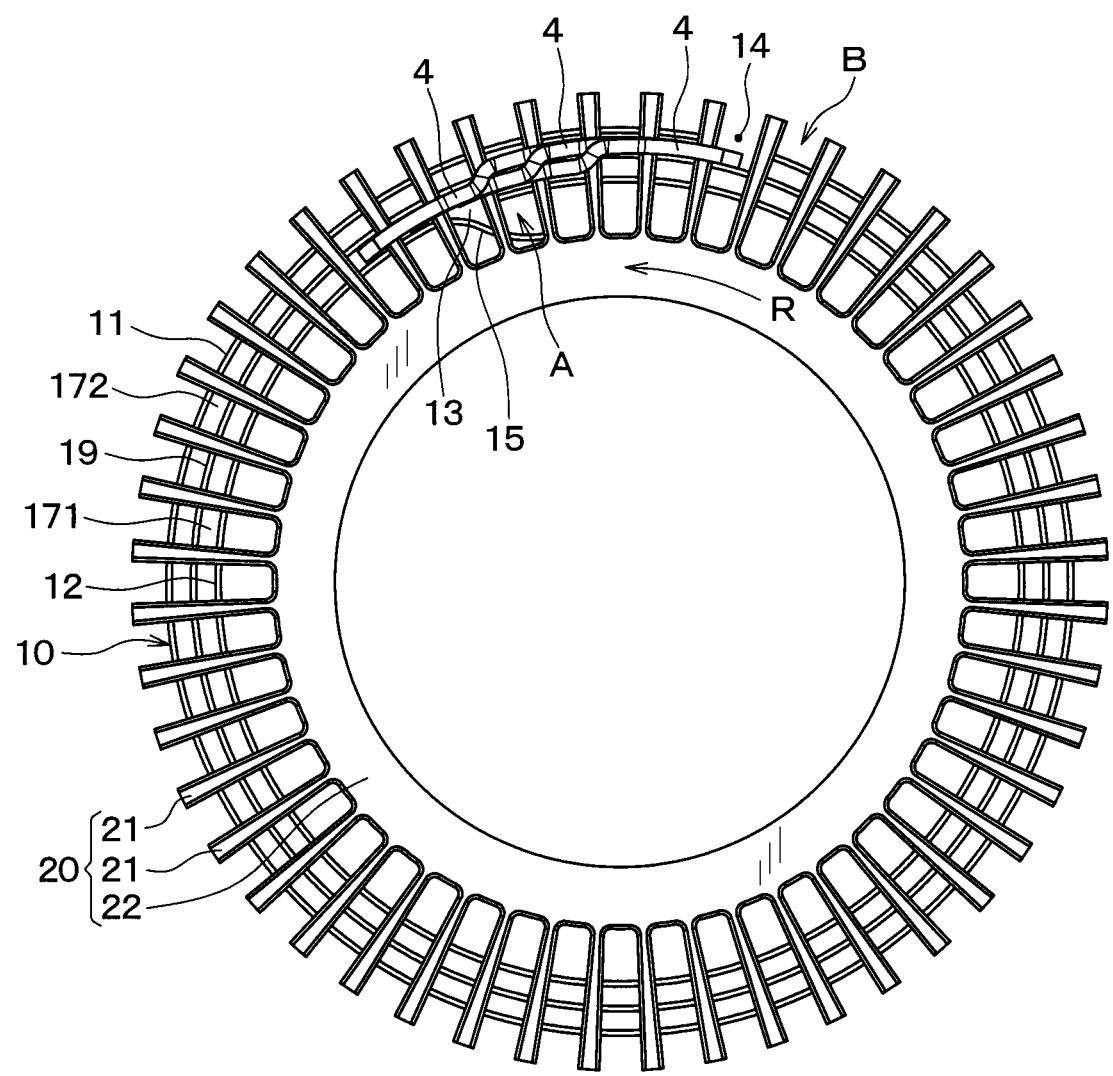
FIG. 23 is a plan view of an aligning apparatus according to a third embodiment.

In contrast, in the aligning apparatus 1 according to the third embodiment, as shown in FIG. 23, the cylindrical jig 10 further has an intermediate cylinder 19 in addition to the outer and inner cylinders 11 and 12.

The intermediate cylinder 19 is a cylindrical member which is radially interposed between the outer and inner cylinders 11 and 12 to partition the receiving space 17 into an inner receiving space 171 and an outer receiving space 172. The inner receiving space 171 is formed between the inner cylinder 12 and the intermediate cylinder 19 to have the first leg portions 41 of the coil segments 4 received therein. The outer receiving space 172 is formed between the outer cylinder 11 and the intermediate cylinder 19 to have the second leg portions 42 of the coil segments 4 received therein.

In the aligning apparatus 1 according to the third embodiment, with the intermediate portion 19, it is possible to prevent the leg portions 41 and 42 of the coil segments 4 forming an aligned coil 2 from being damaged due to radial contact between the first leg portions 41 and the second leg portions 42 of the coil segments 4.

While the above particular embodiments have been shown and described, it will be understood by those skilled in the art that various modifications, changes and improvements may be made without departing from the spirit of the present disclosure.

(1) In the above-described embodiments, the cylindrical jig 10 has the outer entrance 14, the inner entrance 13 and one of the inner guide wall 15 and the outer guide wall 18, which will be together referred to as "coil segment insertion structure" hereinafter, only at one location in the circumferential direction. As an alternative, the cylindrical jig 10 may have a plurality of coil segment insertion structures respectively at a plurality of locations in the circumferential direction.

(2) In the first embodiment, the cylindrical jig 10 is configured to have the inner guide wall 15, but no outer guide wall 18. In contrast, in the second embodiment, the cylindrical jig 10 is configured to have the outer guide wall 18, but no inner guide wall 15. As an alternative, the cylindrical jig 10 may be configured to have both an inner guide wall 15 and an outer guide wall 18.

(3) In the above-described embodiments, the aligning apparatus 1 is configured to have the hook jig 20 rotated by the rotating mechanism relative to the cylindrical jig 10. As an alternative, the aligning apparatus 1 may be configured to have the cylindrical jig 10 rotated by the rotating mechanism relative to the hook jig 20.

(4) In the above-described embodiments, the armature, to which the aligned coils 2 are assembled, is configured as a stator of a rotating electric machine. As an alternative, the armature may be configured as a rotor of a rotating electric machine.

What is claimed is:

1. An aligning apparatus for aligning a plurality of coil segments in an annular shape to form an aligned coil, each of the coil segments being substantially U-shaped to have a pair of first and second leg portions extending parallel to each other and a connecting portion that connects the first and second leg portions, the aligning apparatus comprising:
a cylindrical jig having an outer cylinder configured to surround a radially outer periphery of the aligned coil, an inner cylinder configured to be surrounded by a radially inner periphery of the aligned coil, and a receiving space formed between the outer and inner cylinders to allow the first and second leg portions of all the coil segments to be received therein in a circumferentially-aligned manner; and
a hook jig that is arranged on one axial side of the cylindrical jig and rotatable relative to the cylindrical jig in a rotational direction, the hook jig having a plurality of hooks that are arranged in a radial fashion and spaced at such intervals as to allow the first and second leg portions of the coil segments to be inserted between the hooks,
wherein
the cylindrical jig further has:
an inner entrance which is provided in the inner cylinder within only part of an entire circumferential range of the inner cylinder and through which the receiving space formed between the outer and inner cylinders communicates with a space radially inside the inner cylinder, the inner entrance being formed so as to allow, for each of the coil segments, the first leg portion of the coil segment to pass through the inner entrance;
an outer entrance which is provided in the outer cylinder within only part of an entire circumferential range of the outer cylinder and through which the receiving space formed between the outer and inner cylinders communicates with a space radially outside the outer cylinder, the outer entrance being formed so as to allow, for each of the coil segments, the second leg portion of the coil segment to pass through the outer entrance while the first leg portion of the coil segment passes through the inner entrance; and
at least one of an inner guide wall and an outer guide wall, the inner guide wall extending, from an opening edge of the inner entrance located on a front side in the rotational direction of the hook jig, both radially inward and backward in the rotational direction, the outer guide wall extending, from an opening edge of the outer entrance located on the front side in the rotational direction of the hook jig, both radially outward and backward in the rotational direction.

2. The aligning apparatus as set forth in claim 1, wherein the inner guide wall is configured to guide, during relative rotation between the cylindrical jig and the hook jig, the first leg portion of each of the coil segments from the space radially inside the inner cylinder to the receiving space formed between the outer and inner cylinders.

3. The aligning apparatus as set forth in claim 1, wherein the outer guide wall is configured to guide, during relative rotation between the cylindrical jig and the hook jig, the second leg portion of each of the coil segments from the space radially outside the outer cylinder to the receiving space formed between the outer and inner cylinders.

4. The aligning apparatus as set forth in claim 1, further comprising an insertion device that is configured to insert, for each of the coil segments, the first leg portion of the coil segment into a space defined by one circumferentially-adjacent pair of the hooks and the inner guide wall and the second leg portion of the coil segment into a space formed radially outside the outer cylinder and between another circumferentially-adjacent pair of the hooks.

5. The aligning apparatus as set forth in claim 4, wherein the insertion device is configured to insert, each time the cylindrical jig and the hook jig have rotated relative to each other by an angle corresponding to the interval between each circumferentially-adjacent pair of the hooks, the first and second leg portions of one of the coil segments.

6. The aligning apparatus as set forth in claim 1, further comprising an insertion device that is configured to insert, for each of the coil segments, the first leg portion of the coil segment into a space formed radially inside the inner cylinder and between one circumferentially-adjacent pair of the hooks and the second leg portion of the coil segment into a space defined by another circumferentially-adjacent pair of the hooks and the outer guide wall.

7. The aligning apparatus as set forth in claim 6, wherein the insertion device is configured to insert, each time the cylindrical jig and the hook jig have rotated relative to each other by an angle corresponding to the interval between each circumferentially-adjacent pair of the hooks, the first and second leg portions of one of the coil segments.

8. The aligning apparatus as set forth in claim 1, wherein the cylindrical jig further has an intermediate cylinder that is interposed between the outer and inner cylinders to partition the receiving space into an inner receiving space and an outer receiving space,
the inner receiving space is formed between the inner cylinder and the intermediate cylinder to have the first leg portions of the coil segments received therein, and
the outer receiving space is formed between the outer cylinder and the intermediate cylinder to have the second leg portions of the coil segments received therein.

9. A method of manufacturing the aligned coil as recited in claim 1 using the aligning apparatus as set forth in claim 1, the method comprising:

a step of assembling the cylindrical jig, whose dimensions are set according to outer and inner diameters of the aligned coil, to the hook jig;

a step of inserting the first and second leg portions of one of the coil segments respectively into a space defined by one circumferentially-adjacent pair of the hooks and the inner guide wall and a space formed radially outside the outer cylinder and between another circumferentially-adjacent pair of the hooks;

a step of rotating the cylindrical jig and the hook jig relative to each other by an angle corresponding to the interval between each circumferentially-adjacent pair of the hooks; and a step of removing, after the leg portions of all the coil segments forming the aligned coil have been received in the receiving space of the cylindrical jig, the aligned coil out of the receiving space.

10. A method of manufacturing the aligned coil as recited in claim 1 using the aligning apparatus as set forth in claim 1, the method comprising:

a step of assembling the cylindrical jig, whose dimensions are set according to outer and inner diameters of the aligned coil, to the hook jig;

a step of inserting the first and second leg portions of one of the coil segments respectively into a space formed radially inside the inner cylinder and between one circumferentially-adjacent pair of the hooks and a space defined by another circumferentially-adjacent pair of the hooks and the outer guide wall;

a step of rotating the cylindrical jig and the hook jig relative to each other by an angle corresponding to the interval between each circumferentially-adjacent pair of the hooks; and a step of removing, after the leg portions of all the coil segments forming the aligned coil have been received in the receiving space of the cylindrical jig, the aligned coil out of the receiving space.

* * * * *